United States Patent Office 2,789,884
Patented Apr. 23, 1957

2,789,884
METHOD OF PREPARING PURE BORIC OXIDE

Clement J. Rodden, New Brunswick, and Allan R. Eberle, South Plainfield, N. J., assignors to the United States of America as represented by the United States Atomic Energy Commission No Drawing. Application June 30, 1954, Serial No. 440,575

4 Claims. (Cl. 23—149)

The present invention relates to a method of recovering pure boric oxide from the dimethyl ether complex of boron trifluoride.

The dimethyl ether complex of boron trifluoride has been found suitable for use in a process of isotopic separation of the boron isotopes. The isotope separation is an expensive process and makes the separated single isotope containing complex a very expensive substance. When it is desired to convert this single isotope complex of boron trifluoride to boric oxide, it is important that the conversion be practically quantitative, that is, that the percentage recovery of the boron content of the complex be as close to 100% as feasible and also that the recovered material be substantially free from impurities. Freeing the material from impurities is one of the problems encountered if the conventional conversion procedures are employed. For example, the separation of the pure boric oxide product from sodium, potassium or acetate radicals has been found extremely difficult and has resulted in such low yields that the adoption of the conventional methods was uneconomical for the processing of the expensive single isotope material.

It is accordingly an object of the present invention to provide a method for converting the dimethyl ether complex of boron trifluoride substantially completely to boron oxide.

It is another object of the present invention to provide a method of preparing boron oxide of high purity from the dimethyl ether complex of boron trifluoride.

Other objects will be in part apparent and in part pointed out hereinafter.

In one of its broader aspects the method of the present invention may be carried out by introducing the dimethyl ether complex of boron trifluoride into water, boiling the resultant solution to volatilize dimethyl ether substantially completely therefrom, adding granular calcium carbonate to the boiled solution, maintaining the temperautre of the solution near the boiling point until the pH of said solution is between 5 and 6, filtering the solution while hot and recovering boric acid from the collected filtrate.

The advantages of the method of the present invention may be understood from the following example, which, while illustrative of the method, is not to be understood as limiting the scope thereof.

Example

To 400 milliliters of water there is slowly added with constant stirring 37 milliliters of the dimethyl ether boron trifluoride complex. The solution is boiled for about 2 minutes to vaporize ether therefrom. Approximately 72 grams of calcium carbonate in the form of marble granules or chips (20% by weight in excess of the stoichiometric quantity) are added. The temperature of the mixture is held near the boiling point for approximately one hour. Water is added occasionally to replace the water lost by evaporation. The mixture is stirred constantly during the digestion period to keep the foaming caused by the release of carbon dioxide under control. When the pH of the mixture reaches a value between 5 and 6, it will be noted that the frothing subsides and the mixture is then diluted to about 800 milliliters. To the diluted mixture 150 grams of diatomaceous earth is added to serve as a filter aid. The mixture is digested near its boiling point for an additional 30 minutes and then filtered. The filtration will be found rapid and the filtrate obtained clear. The boric acid is recovered from the filtrate collected.

For higher yields of boric acid, washing of the filter cake is carried out by slurrying the cake in about 400 milliliters of water, heating just to the boiling point and filtering. This filter cake washing procedure may be repeated. The filtrate and filter cake washings are then preferably combined and boiled down to their approximate original volume of approximately 300 to 400 milliliters. A filtration at this point may be found desirable if the solution becomes cloudy. However, if no such cloud develops, the combined filtrate and filter cake washings may be evaporated to dryness and the residue may be ignited to boric oxide. By the procedure outlined above, a yield of approximately 95% to 98% has been achieved.

While the foregoing procedure will be found satisfactory to recover the boron compound in high yield, it will be realized that a number of individual steps of the procedure as described above may be modified without detracting from the efficiency of the method. The dimethyl ether complex of boron trifluoride is a liquid and may be conveniently added to the solvent water. It is necessary to remove the ester from the solution formed. Such removal by boiling has been found convenient and effective. However, other schemes such as passing a gas through the solution may be employed.

The reagent calcium carbonate is preferably added in a granular form such as reagent grade marble chips and in a quantity in excess of the stoichiometric quantity. However, the addition of calcium carbonate in any other form which will provide the same slow controlled rate of evolution of carbon dioxide, such as in the form of granules formed by compressing or pilling of reagent powder, may be employed. The size of the granules chosen depends on the effectiveness of the frothing control available. For a given amount of calcium carbonate larger granules present a smaller reaction surface area and cause the reaction to proceed at a slower pace. The rate of reaction and rate of frothing may thus be controlled by controlling the granule size employed. The addition of reagent in excess of the stoichiometric quantity is not necessary but sufficient calcium carbonate to bring the pH of the solution to between 5 and 6 is necesesary for high yield.

While in the foregoing procedure, maintaining the temperature of the solution near the boiling point for approximately one hour has been found sufficient to form a filterable calcium fluoride product, the time is not critical but other schemes which result in the formation of a filterable calcium fluoride product are satisfactory. For example, maintaining the temperature below the boiling temperature for a longer period of time may produce satisfactory calcium crystalline fluoride.

The object of the addition of water to the solution during the crystal formation period is to maintain the approximate original dilution of the solution to avoid crystallization of boric acid. Any similar scheme which yields the same result, such as use of a condenser, may be employed.

The loss of reaction solution during the evolution of carbon dioxide may be controlled as described above by agitation of the mixture but may be controlled equally well by including antifrothing agents in the solution or by other mechanical means such as directing a stream of air on the surface of the solution.

Generally, the reaction will be found to have reached the desired state of completion when the frothing subsides. Stopping the reaction before the pH has reached 5 is deleterious to the high yield of the reaction. The presence of excess calcium carbonate reagent does not cause the pH to rise above 6 and thus automatically avoids the deleterious effects of excess pH.

The use of a filter aid, such as diatomaceous earth, is preferred for higher purity of product and dilution of the solution after the reaction has been completed prior to filtration may be found helpful. For example, a dilution with approximately an equivalent volume of water as noted in the example above, may facilitate filtration and thus render the yield higher but the method can be carried out although different dilutions are employed and even if no dilution is employed.

Filtration is, of course, not the only means for separating the calcium fluoride from the solution. Other conventional schemes may be employed. While the washing of the filter cake is not essential, it is desirable in order to increase the yield of the reaction. The formation of a cloudy filtrate during the boildown may not be found to occur. The efficiency of the original filtration is an important factor in avoiding this cloud formation.

The combined filtrate need not be evaporated to dryness in order to recover the product. As an alternate scheme, the solution containing boric acid such as that noted in the example above may be boiled down to approximately 150 mil and boric acid may be crystallized from the solution by cooling to approximately 0° C. The boric acid crystals formed may then be filtered and ignited to boric oxide.

From the foregoing description it will be apparent that the present invention provides an unusually effective method of recovering the boron from the dimethyl ether complex of boron trifluoride in high purity and high yield.

It is of course to be understood that the foregoing description is illustrative only and that numerous changes can be made therein without departing from the spirit of the invention set forth in the appended claims.

We claim:

1. The method of recovering substantially pure boric oxide of high yield from dimethyl ether complex of boron trifluoride which comprises introducing said complex into water, volatilizing the dimethyl ether therefrom, adding granular calcium carbonate to said solution, maintaining the temperature of said solution near the boiling point until the pH is between 5 and 6, filtering said solution while hot and recovering boric oxide from the filtrate.

2. The method of recovering substantially pure boric oxide of high yield from the dimethyl ether complex of boron trifluoride which comprises introducing said complex into water, boiling the resultant solution to volatilize dimethyl ether therefrom, adding calcium carbonate in the form of marble chips to said solution, maintaining the temperature of said solution near the boiling point until the pH is between 5 and 6, filtering said solution while hot, collecting the boron-containing filtrate and recovering boric oxide therefrom.

3. The method of recovering substantially pure boric oxide of high yield and purity from dimethyl ether complex of boron trifluoride which comprises introducing a volume of said complex into approximately ten times the volume of water, boiling the resultant solution to volatilize dimethyl ether therefrom, adding calcium carbonate in the form of marble chips to said solution, maintaining the temperature of said solution near the boiling point until the pH reaches between 5 and 6, diluting and continuing to heat said solution, filtering said diluted solution while hot and recovering boric oxide from the collected filtrate.

4. The method of recovering substantially pure boric oxide of high yield and purity from dimethyl ether complex of boron trifluoride which comprises introducing a volume of said complex into approximately ten times the volume of water, boiling the resultant solution to volatilize dimethyl ether therefrom, adding calcium carbonate in the form of marble chips to said solution, maintaining the temperature of said solution near the boiling point until the pH reaches between 5 and 6, diluting and continuing to heat said solution, filtering said diluted solution while hot, collecting the boron filtrate, concentrating said filtrate by evaporation and cooling the collected filtrate to 0° C. to crystallize boric acid therefrom.

No references cited.